United States Patent [19]
Springsteen

[11] Patent Number: 5,462,705
[45] Date of Patent: Oct. 31, 1995

[54] METHOD OF FORMING DIFFUSELY REFLECTING SINTERED FLUORINATED LONG-CHAIN ADDITION POLYMERS DOPED WITH PIGMENTS FOR COLOR STANDARD USE

[75] Inventor: Arthur W. Springsteen, Wilmot Center, N.H.

[73] Assignee: Labsphere, Inc., North Sutton, N.H.

[21] Appl. No.: 4,513

[22] Filed: Jan. 14, 1993

Related U.S. Application Data

[62] Division of Ser. No. 921,980, Jul. 30, 1992, abandoned, which is a continuation of Ser. No. 483,254, Feb. 22, 1990, abandoned, which is a continuation-in-part of Ser. No. 263,633, Oct. 27, 1988, Pat. No. 4,912,720.

[51] Int. Cl.⁶ ............................................. B29C 67/24
[52] U.S. Cl. ..................... 264/122; 264/127; 264/162
[58] Field of Search .............................. 264/118, 122, 264/127, 162

[56] References Cited

U.S. PATENT DOCUMENTS 3,700,627 10/1972 Miller ........................................ 264/127
3,764,364 10/1973 Seiner .
4,035,085 7/1977 Seiner ........................................ 356/79
4,194,040 3/1980 Breton et al. ............................ 264/127
4,408,007 10/1983 Kuhls et al. .
4,587,069 5/1986 Meloy ..................................... 264/102
4,670,503 6/1987 Neumann et al. ...................... 524/520
4,898,944 2/1990 Schwaiger et al. .................... 544/337
4,985,190 1/1991 Ishikawa et al. ....................... 264/122
4,995,727 2/1991 Kawagoe et al. ...................... 356/402

Primary Examiner—Allan R. Kuhns
Attorney, Agent, or Firm—Rines and Rines

[57] ABSTRACT

A novel highly diffuse, consistent reflectance, non-thermochromic and desirable and waterproof series of color standards of sintered fluorinated long-chain addition polymer doped with appropriate pigments, and a method of fabricating the same involving packing and compression density control of the pigment/polymer mixture and concentration control of the pigment dopant in the pre-sintering steps.

14 Claims, 3 Drawing Sheets

METHOD OF FORMING DIFFUSELY REFLECTING SINTERED FLUORINATED LONG-CHAIN ADDITION POLYMERS DOPED WITH PIGMENTS FOR COLOR STANDARD USE

This application is a division of application Ser. No. 07/921,980, filed Jul. 30, 1992, now abandoned, as a file wrapper continuation of application Ser. No. 07/483,254 filed Feb. 22, 1990, now abandoned which, in turn, is a continuation-in-part of parent application Ser. No. 07/263,633, filed Oct. 27, 1988, now U.S. Pat. No. 4,912,720, for Laser Cavity Material (incorporated herein by reference), with aspects of a division thereof and supplemental material involving color standard usage; and is filed pursuant to a restriction requirement in Ser. No. 07/483,254 as to the method or process of the invention.

The invention relates to sintered doped fluorinated long-chain addition polymers and methods of making the same, being more particularly concerned with doping with various pigments (and/or dyestuffs acting as pigments) to produce a diffusely reflecting series of color standards that are environmentally stable, as for such purposes as testing industrial color measurement instrumentation and the like.

BACKGROUND

In said parent application, there is disclosed the use of polytetrafluoroethylene (PTFE) or like polymeric material to efficiently couple flash lamp emissions into the laser medium due to its exceptionally high diffuse reflectance characteristic of better than 99%, and which increases the laser output by as much as 100%. In one embodiment, a unique technique for fabricating the cavity includes both sintering and providing an optimal packing density prior to sintering, with the sintering to take place at atmoshperic pressure to preserve the optimal packing density as closely as possible in the sintered product. This provides an optimal void percentage for optimal reflectivity. For PTFE, packing densities approaching 1.0 $g/cm^3$ yield an opaque optimally reflective material. Moreover, in one embodiment, the unsintered particle size is maintained at less than 50 microns to obtain the machinability required for laser cavities, with the granular starting material having an impurity content of less than 10 particles per square inch so that disintegration or degradation of the laser cavity material due to pitting is prevented, with all presintering processing done in a clean room to avoid contamination of the sintered product.

In contradistinction to prior use of sintered PTFE for reflectance targets, and in contradistinction to non-optimal prior packing densitites described and referenced in said parent application (including U.S. Pat. Nos. 3,764,364 and 4,035,085 and the work of Hsia), the invention provides a diffuse highly reflective polymeric material made into a laser cavity, with the material having a greater than 99% reflectance in the visible and near IR regions of the electromagnetic spectrum. Providing such a material for a laser cavity can result in doubling the laser output. Moreover, experimentation has shown that such material has survived energy concentrations of as much as 95 joules, making it an ideal candidate for laser cavities.

In one embodiment, a unique process is used to produce laser grade cavities, in which a compressed block of polymeric material is sintered under atmospheric pressure so that critical low presintering packing densities can be maintained in the final product. The maintenance of low packing density provides for sufficient voids to produce optimal reflectivity; and this is demonstrated by the lack of translucency of the sintered product. As part of the invention, it has been found that the preferred void volume is in the range of 30% to 50% for optimal reflectance properties.

In one embodiment involving PTFE, an initial packing density of 0.856 grams per cubic centimeter results in a final density of 1.13 grams per cubic centimeter after sintering. This produces a highly reflective sintered material which is not translucent. It is a feature of the invention that sintering is performed at atmospheric pressure, which assures that the final density of the product can be precisely controlled to optimize void volume and thus reflectivity.

With atmospheric sintering, it is a finding of the invention that once cooled, an opaque white sintered polymeric material can be formed which has a nominal reflectance of greater than 99% over the wavelength range of 300–1,400 nanometers, greater than 98.5% over a range of 250–2,000 nanometers and, inter alia, a greater than 95% reflectance over the range of 250–2,500 nanometers. This is also true of unsintered product, assuming the unsintered product has an optimal packing density. This optimal packing density can be ascertained empirically for a wide variety of resins.

The class of materials contemplated for use in this invention is defined by those materials which comprise at least one fluorinated aliphatic long chain addition polymer, in turn comprised of at least one monomer having at least one fluorine atom attached to a chain carbon atom.

Polymers which fall within the above-described class of materials are well known in the art and include the various homopolymers of the above-described monomers, co-polymers of these monomers and other monomers not of the above-described class, and crosslinked polymers formed from these homopolymers and copolymers which will conform to the hereinafter described reflectance requirements. Some examples of these polymers are: polytetrafluoroethylene, polychlorotrifluoroethylene, polychlorofluoroethylene, polyvinylidene fluoride, and polyvinyl fluoride.

Some examples of monomers which may be used to make up both homopolymers and copolymers of the above-described polymers within the aforementioned class of materials are: 1.3-butadiene hexaflouride, 1-chloro- 1-fluoroethylene, chlorotrifluoroethylene, 1.1-difluoroethylene, vinyl fluoride, 1-fluoroacrylonitrile, and fluorinated acrylic-acids such as 1-fluoroacrylic acid and 2.2-difluoroacrylic acid, and tetraflouroethylene.

Examples of other monomers which may be used with the above-described monomers to form copolymers within the aforementioned class of materials are: ethylene, propylene, acrylic acid, methacrylate esters and the like.

Other possible high reflectance polymers are Dupont FEP or fluoronated ethylene propylene copolymer; Dupont PEA, perflouroalkoxy coploymer; polyisoproplyidene fluoride; polyvinyl fluoride; polyvinylidene fluoride; polychlorofluoroethylene; and other polychlorofluoroalkenes.

With respect to doping, doped laser cavities can be made in accordance with the invention of said parent application if the dopant is stable at the sintering temperature and the dopant particle size is less than or equal to that of the particulate material utilized in making the cavity. This means that for PTFE, the dopant material size is desirably less than 50 microns.

It is also a requirement in making doped cavities that adequate mixing be performed to meet uniformity specifications. Also, the dopant and the material of the subject cavity must not interact at the sintering temperature.

Such doped materials have been previously manufactured for use as wavelength calibration standards with the various designations being WCS-HO, WCS-DO and WCS-EO corresponding to holmium, dysprosium, and erbium metal salts. Moreover, rare earth oxides such as those of lanthanum, neodymium, praeseodymium, ytterbium, yttrium, sadolinium and samarium may be utilized as dopants. Previous work has shown that inorganic metal salts that are thermally stable at the sintering temperature of the material involved may be used as a dopant.

What has herefore been found is that when polymers of the type described are sintered at atmospheric pressure, an opaque polymer is produced which exhibits unexpectedly high reflectivity. The ability to control the reflectivity by sintering under atmospheric pressure means that by merely controlling the packing density prior to sintering, one can control to a substantial certainty the density after sintering. Thus, for PTFE with an optimal density of 0.856 grams per cubic centimeter, the packing density after sintering can be controlled to 1.10–1.40 g/cm$^3$. It is noted that 99% reflectivity in the visible region of the electromagnetic spectrum requires a final sintered density of less than 1.5 g/cm$^3$ for PTFE.

One of the other critical parameters in the laser cavity manufacturing process is the particle size of the presintered granular material. With respect to the optimal particle size, presently, the range most useful for optimum reflectance and machinability is in the 20 to 50 micron range. PTFE resins do in fact come in particle sizes greater than 350 microns. However, these particles upon sintering yield only 97% reflectance due to lack of voids. Moreover, they are not easily machined because they crumble. Such lack of machinability as well as the 2% lower reflectance at the wavelengths of interest make the 50 micron particle size desirable for PTFE granules.

In terms of manufacture, in one embodiment, the laser grade material is prepared first by blending a suitable resin to a very fine particle size. It has been found that the laser grade material desirably has an impurity content of less than 10 particles per square inch.

It has also been found that it is critical that all presintering processing be done in a clean room to prevent contamination so that the impurity level can be kept to the above-mentioned low level.

After blending the material, for PTFE, it is compressed to a presintered density of between 1.0 and 1.2 grams per cubic centimeter. Lower pressure results in a material of high reflectance but more difficult machining problem, while over compression results in a material of lower reflectance due to increased translucence in the final product. Once compressed in a mold to a block of suitable size and shape, the block is placed on a plate and is sintered at a temperature of between 360° C. to 370° C. for a number of hours dependent on the size of the piece to be sintered.

Once sintered, the material is cooled slowly to avoid cracking. The final shape of the product is determined by machining of the sintered block. Machining can be done using normal machine shop equipment including lathes or milling machines, with the provision that the machining equipment be very clean in that no lubricant other than water be used in the machining. It is also a requirement that the material being machined not be compressed greatly during the machining process.

Final finishing of the product is then accomplished by sanding under a stream of water to remove any grit from the material. It is extremely important that the material be kept free of all oil or solvents excluding water at all times during the process to retain its reflective properties without contamination.

The requirement for cleanliness in this procedure cannot be overstressed. Any impurity introduced into the material at any point in the process can cause major damage to the laser cavity when exposed to high intensity light, as in a flash lamp pumped laser system.

The advantages of a diffuse laser pumping cavity made in accordance with the teachings of this invention over existing ceramic cavities, metal reflectors, barium sulfate coatings and samarium filter glass cavities are as follows:

First, the subject cavities have the highest known diffuse reflectance of any diffuse laser pump cavity substrate. Therefore less radiation is lost to absorption by the cavity material and more energy is coupled into the laser medium which results in a more efficient laser. As mentioned above, increasing the reflectance for 97% to 99% increases the laser output by 100%.

Secondly, the subject cavities are the most diffuse reflectors possible, and hence are responsible for extremely uniform pumping of the laser medium which results in an optimum beam profile.

Thirdly, the subject cavities may be fabricated using standard machine shop equipment except for the above-mentioned cleanliness requirement so that cavity geometries may be prototyped easily and relatively inexpensively. The subject material is also comparable with various coupling geometries to suit user preference for special requirements.

Most importantly, the subject cavities have exceptionally long lifetimes because they are not subject to tarnishing as are diffuse silver reflectors. Moreover, the subject cavities are compatible with gas and liquid coolants and do not degrade when exposed to ultraviolet radiation, as do barium sulfate cavities.

Moreover, regardless of the use of the subject material for laser cavities, because of its high reflectivity and machinability it can be used for other applications. The subject material may be doped to produce color reflectance standards, wavelength calibration standards and grey reflectance standards, and, as later explained, it is particularly to such color standard usage that the present application is directed. Alternatively, it can be used undoped for any of a variety of situations demanding high diffuse reflectivity.

Polymeric material having 99% reflectivity can thus be obtained in machinable shapes and can be used wherever high reflectivity material is required. Note that the subject material can be used for laser cavities in an unsintered state assuming it can be encased in glass or some transparent non-degradable encapsulating medium or carrier.

As above stated, however, the concern of the present application is with the application of such novel doped fluorinated long-chain addition polymers, doped with various pigments and/or dyestuffs, to provide diffusely reflecting color standards of vastly improved characteristics later delineated.

Turning, therefore, more specifically to the background and prior art limitations of color standards, the materials now used commercially fall into three major categories, namely: a) ceramic tiles fired with a clear glaze over a colored base material; b) colored opaque glasses; and c) painted panels backed with any number of substrates including metal, paper, wood, or the like.

Each of these materials, however, has its disadvantages. Ceramic tile may, upon improper storage, "bloom" or develop a hazy film which may change the materials chromaticity. They are also specular in character due to the glaze, which may give misleading chromaticity data as the angle of viewing or illumination is varied. Ceramic tiles also are generally quite thermochromic, thermochromicity being that property of material that leads to a change in color dependent on the temperature of the material.

Opaque glass standards are also specular, with the same disadvantages of a tile. In addition, even the most opaque glasses are to some extent translucent. This translucency also can give inaccurate readings upon measurement by colorimeters. Finally, if a glass color standard becomes scratched, the scratches may render it unusable due to uneven scatter of the incident light from the surface.

Painted panel standards are by far the most available color standards in current use. These materials are available commercially, such as the Munsell color standards produced by Munsell Color Division of Kollmorgen. They may also be produced by the individual user as needed for quality control. Advantages are the wide variety of colors available, low cost, and ease of preparation and use. Disadvantages include thermochromicity, lack of enviromental stability (colors may fade upon aging or exposure to long term light), and lack of durability of the coated surface.

The invention, on the other hand, provides a new class of color standards that is thermally and chemically stable. The color of the standards is independent of viewing geometry. The standards, as before stated, are produced from doping a fluorinated long-chain addition polymer with various pigments and/or dyestuffs. As the standards are a monolithic material as opposed to being a coated material as in the previous art, they may, if damaged or marred, readily be refinished by the user to return to original color. The materials are also waterproof and environmentally stable.

They provide color standards useful in developing consistent color reproduction for manufacturers of products such as textiles, paper, pharmaceuticals, paints and inks, with a virtually unlimited palette of colors with diffuse, durable and consistent reflectance properties. Such high diffusivity, offering reflectance properties that are nearly perfectly lambertian and with color independence of viewing geometry, coupled with their reflectance consistency and reproducability, and non-thermochromic properties that obviate the need to control temperature in a laboratory setting, and their durability and washability and easily machineable properties without loss of color or surface texture, and their retaining of uniformity throughout despite exposure to harsh environments, all render them particularly ideal for such purposes, among others, as calibrating colorimeters and spectrophotometers.

OBJECTS OF INVENTION

The object of the present invention, accordingly, is to provide new and improved color standards and methods of making the same; more specifically, novel diffusely reflecting fluorinated long-chain addition polymers doped with pigments and/or dyestuffs to provide vastly improved color standards that are not subject to the previously described and other limitations of prior standards, and to a novel method of fabricating such standards.

Other and further objects will be explained hereinafter and are more particularly delineated in the appended claims.

SUMMARY

In summary, however, from one of its broader viewpoints, the invention embraces a color standard for colorimetry and related uses comprising a sintered material having at least one fluorinated aliphatic long chain addition polymer having at least one monomer, wherein at least one fluorine atom is attached to a chain carbon atom, said material including throughout an inorganic pigment dopant selected from the group consisting of inorganic metal salts of the type that are thermally stable at the sintering temperature of said material. Preferred and best mode formulations and embodiments and fabrication or forming methods and techniques are hereinafter presented in detail.

BRIEF DESCRIPTION OF THE DRAWINGS

The invention will now be described with reference to the accompanying drawing, FIG. 1 of which is a block and flow diagram from said parent application illustrating the preferred processing steps utilized in the fabrication of the diffuse sintered reflecting polymer of said application.

DETAILED DESCRIPTION OF THE INVENTION

Figure 1:
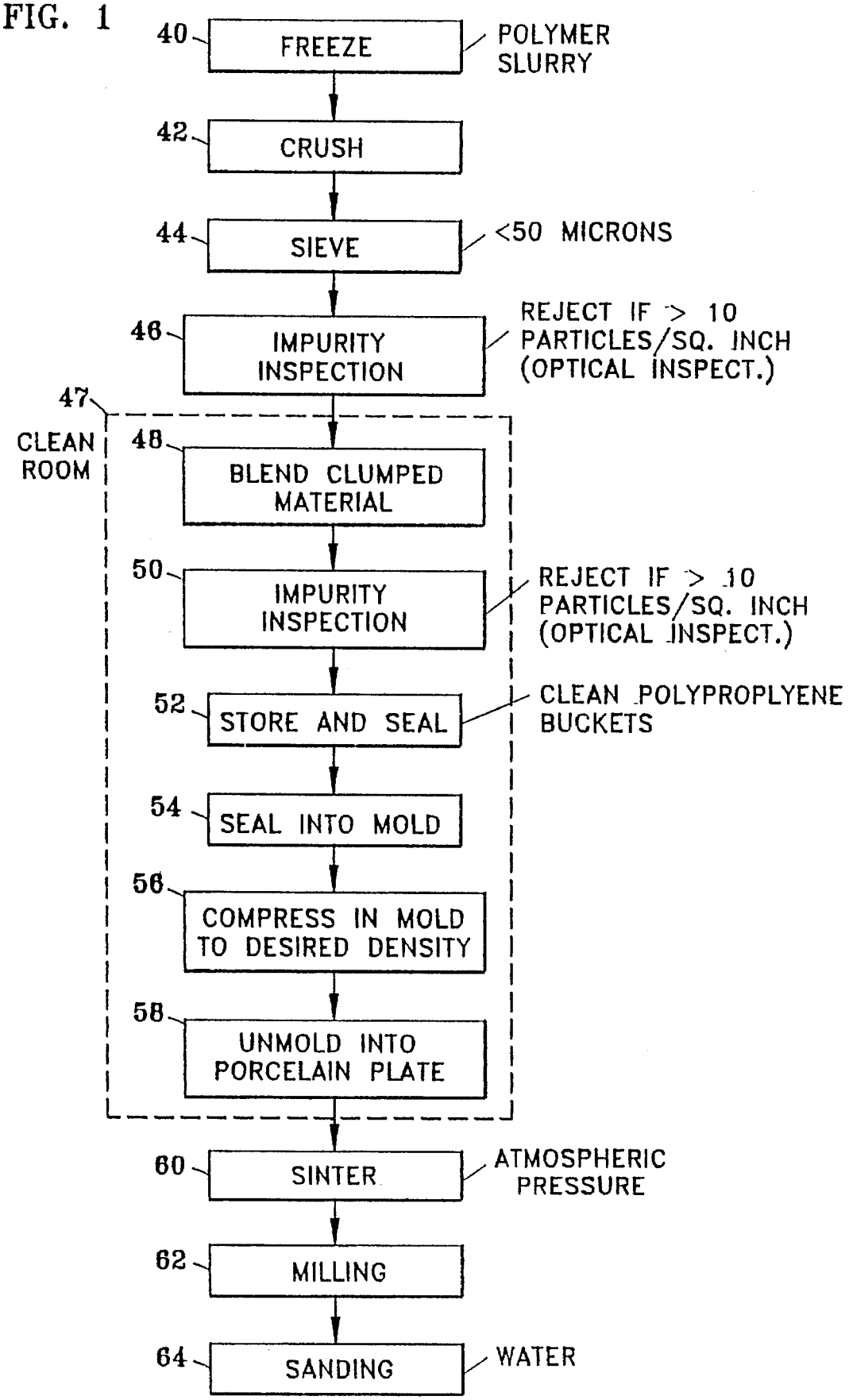

Referring to FIG. 1, the manufacturing process for the diffuse reflecting polymeric material used to form the flashlamp operated laser cavity, as described in said parent application, is illustrated in terms of the utilization of PTFE. PTFE is available from a number of sources. Commercial PTFE resins are available essentially in two ranges of particle size, namely 20 to 50 microns and greater than 350 microns. Manufacturers of PTFE in less than 50 micron particles sizes are Ausimont, resins G80, F-5 or F-6; ICI America, resin Fluon-281; E.I. Dupont Demours & Co., resin 7A and 7C; and Sumitomo, resin M-12. The production process is fairly simple. The material is first frozen as shown at 40 at liquid nitrogen temperature. The resulting solid is then crushed as shown at 42; and is then sieved as shown at 44 to a preferred particle size of less than 50 microns. It will be noted that larger particle sizes are not easily machinable. Also, the larger particle size is not quite as reflective because the voids are not within the 30% to 50% range that is required for optimal reflectance.

As illustrated at 46, an impurity inspection of the sieved material is performed which involves rejection if there are greater than 10 impurity particles per square inch. This impurity concentration is established by optical inspection techniques, with the optical inspection having taken place after the material is isolated for 24 hours in a clean room 47. The optical inspection of a sample may be done either in the clean room or outside it.

Assuming a batch of material which meets the above requirements, the material is blended at 48 in the clean room, in one instance in a Cuisinart with stainless steel blades so as to finely divide any clumped material. The material is then optically inspected at 50 and checked for impurities, i.e. less than 10 impurity particles per square inch. Thereafter the material is stored and sealed at 52 in a clean polypropylene bucket that is used for nothing but storage of PTFE material. Then the material is made into blanks for laser cavity production. Note that all presintering production is preferably accomplished in the clean room.

Figure 2:
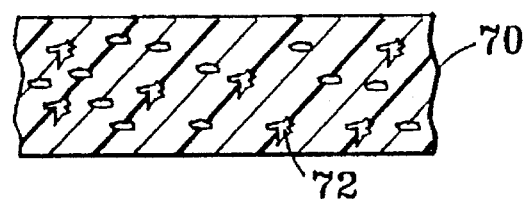
FIG. 2 is a cross-sectional view of a portion of such final sintered product made by the process outlined in FIG. 1 and in which the voids occupy between 30% and 50% of the final product, thereby to yield a better than 99% diffuse reflectance, as before described.

The cavities are made either in rectilinear or cylindrical form in which the amount of PTFE is weighed out, placed in the mold, and compressed at 56 to a predetermined density, which is the unmolded or presintering density. For PTFE, the presintering density is on the order of 1.0 grams per cubic centimeter, with the compression being accomplished in the clean room. For maximum reflectance it has been found that 0.856 g/cm$^3$ of PTFE yields a 1.13 g/cm$^3$ density in the final product. It has also been found that if the initial packing density is raised above 1.5 g/cm$^3$, the final density is an unacceptable 2.2 g/cm$^3$ because the final product has an insufficient void volume. It will be appreciated that the higher the final density, the lower will be the reflectance due to a decrease in the void volume. As illustrated in FIG. 2, in a preferred embodiment, final product 70 has a void 72 volume of 30% to 50%.

Referring back to FIG. 1, the compressed material is unmolded at 58 and is placed on a ceramic plate which is positioned in the sintering oven where the cake or block of material is sintered as shown at 60. In one embodiment, the block is sintered at ambient pressure at 360° C. for better than four hours.

The sintered block is milled at 62 and is sanded at step 64. The sanding procedures essentially involve the use of silicon carbide grit paper, utilized under a stream of running water, the running water serving to wash away particles produced during the sanding process, keeping the pores or voids cleam. Personnel are instructed to wear gloves during the process in order to keep finger oils or the like from getting into cavity material. Any contact with any non-polar material such as machine oil, grease, or the like provides contaminants that enter the voids and are very difficult to remove. Such contaminants may absorb light as the cavity is used, thereby decreasing the reflectance of the cavity material, and leading to the degradation of the laser cavity due to overheating.

Any contamination which is associated with the molding process is on the surface of the blank. Thus when the blank is machined, any contamination acquired during the molding or sintering process is removed.

The sintering process takes place at ambient pressure for two reasons. First, it is a matter of convenience. Secondly, sintering at ambient pressure maintains the critical low presintered density and thus provides the optimum void volume in final sintered product. This in turn yields the highest diffuse reflectance characteristic presently known. An increase in initial packing pressure or sintering of a low density material under mold pressure would result in a material with a lower void volume and thus inferior diffuse reflectance properties. In short, the use of atmospheric pressure sintering provides control over the density of the final product so that it is close to that of the unsintered product, with the final density resulting in void volumes of between 30% and 50%.

The effect of variation in density on reflectance and the mechanical properties of the sintered PTFE material is now described.

The following experiments were utilized to discover the general relationship between the density at which PTFE is prepared and its reflectance properties as a finished product. In the experimental procedure, varying amounts of PTFE were compressed in a cylindrical mold to a uniform volume of 17.4 cubic centimeters. The product of this operation was a disc-shaped sample 3.81 centimeters in diameter having a thickness of 1.27 centimeters. These discs were then sintered at a temperature of approximately 360° for a period of not less than four hours and allowed to cool very slowly inside the furnace. Samples were prepared by sanding with fine sand paper and reflectance properties of the sanded surface were measured on a reflectometer over a range of wavelengths from 250 nm to 2,500 nm. Note the density of each sample was altered during the sintering process. In general the term density, when applied to the PTFE sample can refer to either the density to which it was compressed prior to sintering or its final density after sintering. For the experiments described below, density is the presintered density, since the density of compression is easier to control and measure. The range of densities considered was limited, with a lower limit established by the requirement that the material be machinable and with the upper limit being established by the requirement that the material retain its properties as a diffuse reflector. It should be noted that at presintered densities higher than 2 g/cm$^3$ the sintered material is noticeably translucent in thin section and exhibits poor diffuse reflectance properties. To some extent this effect is observable even within the range of presintered densities considered here, namely 0.856–2 g/cm$^3$.

Experiment 1

Samples with a density of 0.856 g/cm$^3$ were prepared as described above by compressing 14.9 g of material to the standard volume and sintering. The result was a sample with excellent reflectance properties: reflectance was well over 95% over a range of wavelengths from 250 to 2,500 nm, and for 250–2,000 nm reflectance was greater than 98.5%. For 300–1,400 nm the reflectance was approximately 99%.

Experiment 2

Samples with a density of 1 g/cm$^3$ were prepared as above by using 17.4 g of material. The resulting reflectance properties were virtually indistinguishable from those observed in Experiment 1.

While the reflectance properties of these samples were very nearly as good as those observed in Ex. 1, their mechanical properties were significantly better; with an increase in density, the material becomes much less susceptible to crumbling or tearing during the machining process.

Experiment 3

Samples with a density of 1.17 g/cm$^3$ were prepared as above by using 20.4 g of material. For the visible region, the reflectance of these samples sloped downward with increasing wavelength, falling below the reflectance observed in Ex. 1 by about 1% at 1,800 nm, and by 3–4% at 2,500 nm. This lack of spectral flatness makes the material less efficient as a reflectance material at this density, although its performance is still superior to that of materials currently in common use.

Experiment 4

Samples with a density of 1.5 g/cm$^3$ were prepared as above by using 26.1 g of material. Reflectance of these samples exhibited a significant slope, falling from over 95% at a point within the visible range to as low as 50% at longer wavelengths. This 1.5 g/cm$^3$ density thus was found to be the practical upper limit for PTFE.

At this density, these samples exhibited less shrinkage during sintering than those of the experiments above, and they were noticeably harder.

Experiment 5

Samples with a density of 2 g/cm³ were prepared as above by using 34.8 g of material, Reflectance of these samples exhibited a relatively drastic slope, dropping from greater than 95% in the visible to 20% at 2,500 nm.

At this density, the material exhibited very little shrinkage during sintering, and these samples were significantly harder than the others.

It can be seen from the above experiments that the presintered density of PTFE is an important factor in determining reflectance properties. A very high reflectance and a high degree of spectral flatness over a range from 250–2,500 nm is obtainable at a compression of near 1 g/cm³, while at higher presintered densities, reflectance decreases significantly, especially at longer wavelengths. For PTFE, the optimum presintered density considering both machinability and reflectance properties, is therefore very near 1 g/cm³.

Note that other resins have optimal presintered densities which can be obtained empirically. As long as the void volume is between 30% and 50% after sintering, optimal diffuse reflectance is achieved.

Turning, now to the specific color standard application of the present invention, it was previously stated, in said parent application, that while for the laser cavity application various dopants were used, for wavelength calibration standards, other dopants including inorganic metal oxides were appropriate.

Examples of dopants to improve performance as a laser cavity material are Cerium oxide (a fluorescent material which shifts short wavelength (<460 nm) up in wavelength to the Nd pump band) and samarium oxide. Barium sulfate may be used as an opaquing agent, particularly for providing higher reflectance when used in thin, translucent section (<7 nm), and to reduce translucenty—such being very useful for white properties. To produce narrow absorbance bands as for checking the spectral scale of reflectance spectrophotometers or in similar uses, holmium oxide, dysoprosium oxide and erbium oxide or related salts mentioned in siad parent application, are useful. And reduced reflectance (black or grey) can be achieved with carbon black and cobalt oxide as is well known in many applications. For different colors between white and black, the previously mentioned inorganic metal salt pigment dopants including rare earth oxides (lanthanium, neodynium, praeseodymuim, ytterbium, yttrium, gadolinium and samarium), thermally stable at the sintering temperature of the material, are most useful. As before stated, preferred pigment or dyestuff particle size sintered throughout the material is less than 50% and is in proportion of from about $1.0 \times 10^{-5}\%$ to 20%.

In terms of manufacture of the color standard, the bulk fluorinated resin is prepared by blending at 48 to a suitable particle size as described in connection with the process of FIG. 1. The desired pigment dopant is then added in a concentration to produce the required standard of hue, value, and chroma and blended at 48 until a pressed pellet of the material gives a sample of uniform appearance. Incomplete blending gives rise to samples that are mottled and thus unsuitable for use as color standards.

Figure 3:
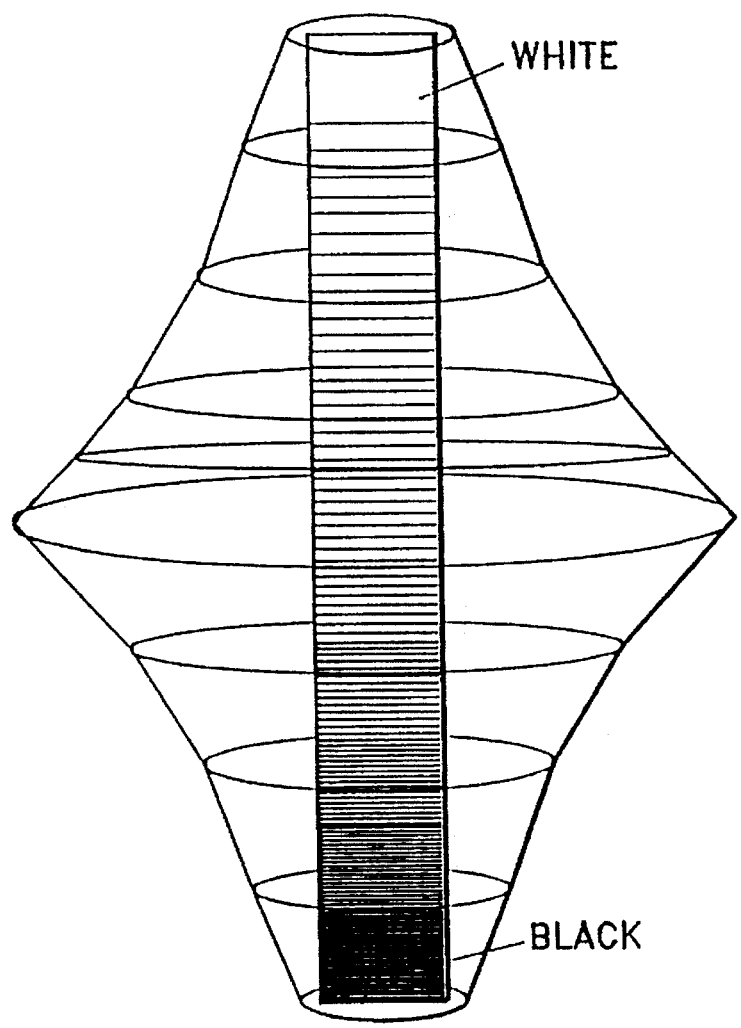
FIG. 3 is a value-chroma-hue diagram for color standard evaluation.

The "value", "chroma" and "hue" desired for the color standard are illustrated on the scale of FIG. 3 wherein "value" is represented in the center axis by grey scale; the "chroma" is represented from the center rink to the outside circular cross section; and progression around the circle represents "hue". The "value" is variable, in accordance with the invention, by increasing or decreasing the amount of the initial pigment in the standard material or by addition of an achromatic black or white pigment dopant, beforementioned. The "chroma" may be varied by increasing or decreasing the concentration of the original pigment (which, as above-stated, also affects the "value"). The "hue" may be changed by changing pigments or by mixing the same.

By changing the initial packing density of the pigment/polymer mixture both chroma and value may be changed. In addition, gloss may be introduced by proper post-sintering surface preparation, as later explained.

The blended material at 48 is then weighed and compressed at 86 to give a standard of known density, the color of the final product being directly related to the pre-sintering compression density. Once compressed to a suitable size, the material is sintered at 60 upon a porcelain plate 58 at 360°–370° C. for a predetermined number of hours, where the sintering time is dependent upon the size of the piece.

Once sintered, the material is cooled slowly to avoid warping or cracking. After cooling, the material may be finished as by machining using normal machine shop equipment, including lathes, milling machines, and the like, as at 62.

Final finishing of the surface of the product may be achieved by sanding the product at 64 under a stream of running water to the desired surface finish. By using the appropriate grit of abrasive media, surfaces from extremely diffuse(flat) to highly specular (glossy) may be obtained.

By judicious choice of pigments, densities and concentrations of dopants, a variety of colors equivalent to any prior art color standard may be produced.

Figure 4:
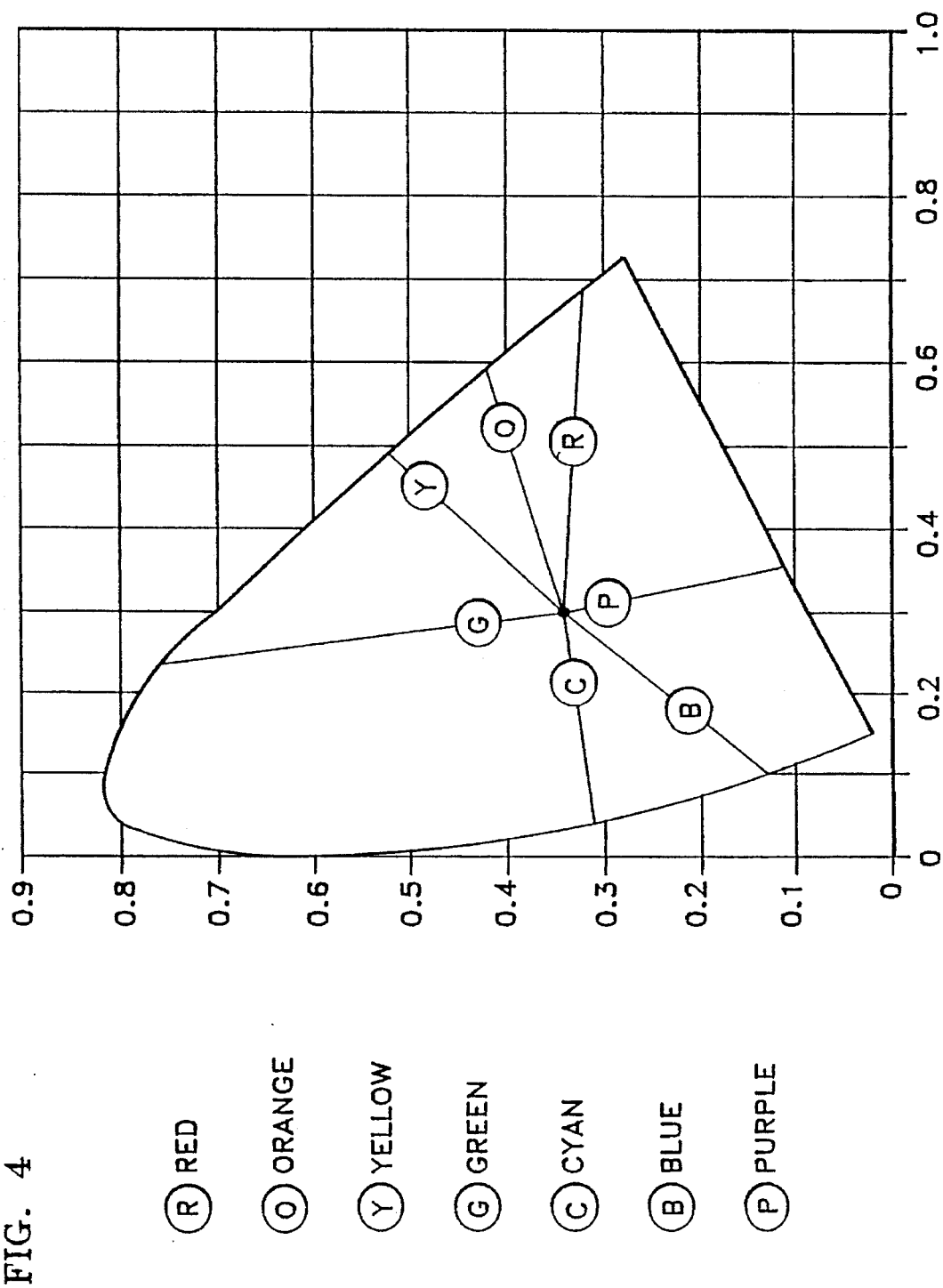
FIG. 4 is a color reflectance chart showing the position of different colored standards of the invention.

Thus, with reference to FIG. 4, color standards of the present invention made by this technique have the respective chromaticities shown at R (for red—using Degussa 3001 pigment dopant); G (for green—using Degussa 6060); B (for blue—using Degussa 5002); and Y (for yellow—using Degussa 1020).

Further modifications will occur to those skilled in this art and such are considered to fall within the spirit and scope of the invention as defined in the appended claims.

What is claimed is:

1. A method of fabricating a diffusely reflecting fluorinated long-chain addition polymer doped with pigments to produce a color standard, that comprises, adding solid particle pigment dopant to a fluorinated aliphatic addition polymer solid particle material, with a concentration of pigment dopant particles sufficient to produce the desired hue, value and chroma of the standard; blending the material to produce a mixture of uniform appearance; compressing the blended material to a suitable compressing density for the desired standard color; sintering the compressed material at atmospheric pressure; cooling the sintered material; and finishing the surface of the sintered product by machining and abrasive treatment.

2. A method as claimed in claim 1 and in which said density is adjusted to provide a 30–50% void volume.

3. A method as claimed in claim 1 and in which the said value and chroma are adjusted by increasing and decreasing one or both of the initial pigment and the concentration thereof.

4. A method as claimed in claim 1 and in which the said hue is changed by changing pigment and mixtures thereof.

5. A method as claimed in claim 1 and in which the said value is varied by addition of an achromatic black or white pigment.

6. A method as claimed in claim 1 and in which the said chroma and value are varied by varying the initial packing density of the pigment/polymer mixture.

7. A method as claimed in claim 1 and in which the degree of the said abrasive treatment is varied to produce surfaces from extremely diffuse and flat finish to highly specular and glossy finish.

8. A method as claimed in claim 1 and in which the polymer particle size is less than about 50 microns and the packing density thereof is adjusted to be about 1.0 g/cm$^3$ to yield a void volume in the sintered material in the range of about 30% to 50%.

9. A method as claimed in claim 8 and in which the pigment dopant particles are of size equal to or less than these of the polymer particles and in a weight concentration range of from about 0.05% to about 10%.

10. A method as claimed in claim 8 and in which the proportion of dopant particles throughout the material is in the range of from about $1 \times 10^{-5}$% to 20%.

11. A method as claimed in claim 1 and in which the polymer is selected from the group consisting of polytetrafluoroethylene, polychlorotriflouroethylene, polychlorofluoroethylene, polyvinyledene fluoride and polyvinyl fluoride, fluoronated ethylene propylene copolymer, perfluoroakloxy copolymer, polyisopropylidone fluoride, polyvinylidene fluoride, and polychlorofluoroalkenes.

12. A method as claimed in claim 11 and in which the monomer of the polymer is selected from the group consisting of 1.3-butadiene hexafluoride, 1-chloro-1-fluoroethylene, chlorotrifluoroethylene, 1.1-difluoroethylene, vinyl fluoride, 1-fluoroacrylonitrile, and fluorinated acrylic-acids including 1-fluoroacrylic acid, 2.2-difluoroacrylic acid, and tetrafluoroethylene.

13. A method as claimed in claim 1 and in which the dopant is an inorganic pigment dopant selected from the group consisting of oxides of holmium, dysprosium, erbium, cobalt, titanium, aluminum, lithium, lanthanum, neodymium, praesodymium, ytterbium, yttrium, gadolinium, samarium, cerium, zinc and tin.

14. A method as claimed in claim 1 and in which white dopant pigment particles of barium sulfate are sintered throughout the material to render the same of reduced transparency or increased opacity.

* * * * *